Dec. 1, 1936.  S. J. KRUCZEK  2,062,583
BALANCING FLYWHEEL
Filed Nov. 27, 1935
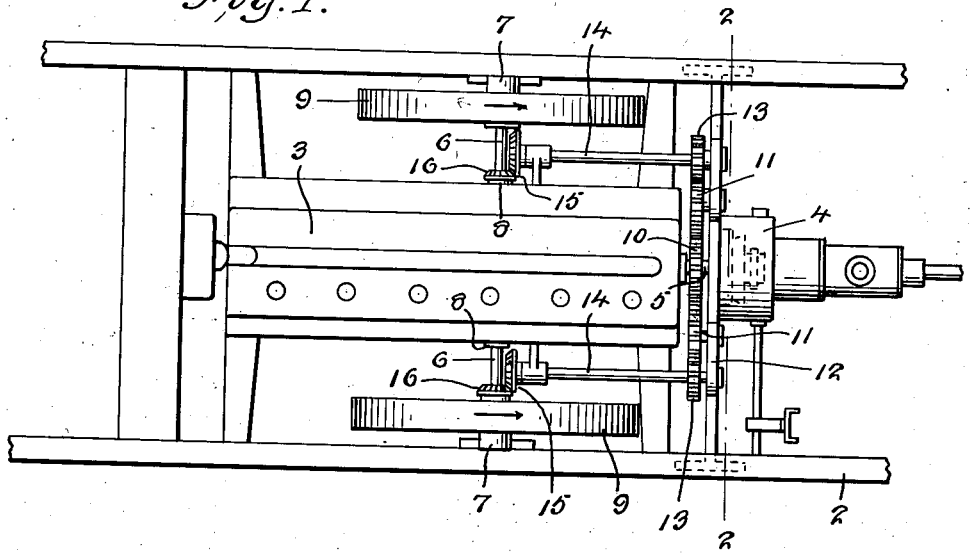
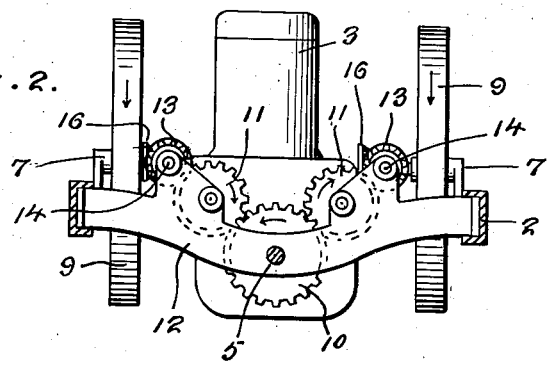
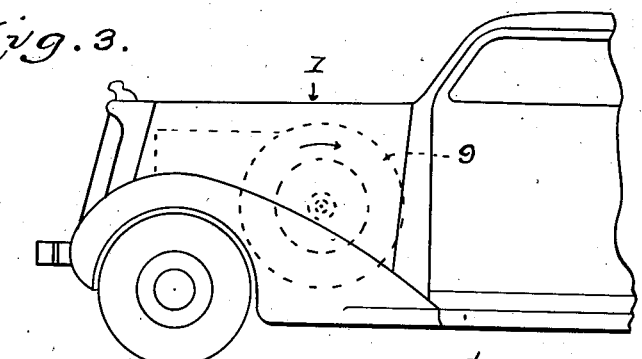
Stanley J. Kruczek
INVENTOR
BY Victor J. Evans & Co.
ATTORNEY Patented Dec. 1, 1936

2,062,583

UNITED STATES PATENT OFFICE 2,062,583

BALANCING FLYWHEEL

Stanley J. Kruczek, Buffalo, N. Y.

Application November 27, 1935, Serial No. 51,912

1 Claim. (Cl. 180—1)

This invention relates to balancing devices for motor vehicles either land or water type, and has for the primary object the provision of balancing means propelled by the power source of a motor vehicle and so mounted to the latter that forces tending to overturn the motor vehicle while traveling on curves will be checked or acted on and consequently obviate accidents due to the motor vehicle becoming off-balance and overturning and also will aid motor hill climbing by the momentum of the device and the power given off thereby and will retard the motor when descending a hill, besides providing smoother operation of the power source.

With these and other objects in view, this invention consists in certain novel features of construction, combination and arrangement of parts to be hereinafter more fully described and claimed.

For a complete understanding of my invention, reference is to be had to the following description and accompanying drawing, in which Figure 1 is a fragmentary top plan view illustrating a motor vehicle chassis supporting a power source to which is connected balancing means constructed in accordance with my invention.

Figure 2 is a transverse sectional view taken on the line 2—2 of Figure 1.

Figure 3 is a fragmentary side elevation illustrating a motor vehicle and showing the approximate location thereon of the balancing means.

Referring in detail to the drawing, the numeral 1 indicates a fragmentary portion of a motor vehicle wherein the chassis is indicated at 2, and the power source or engine by the character 3. The engine 3 is connected to the usual clutch 4, that is, the crank shaft 5 of the engine is connected to the clutch. Shafts 6 are journaled to the chassis 2 at opposite sides of the engine 3 and are arranged in alignment with one another and transversely of the chassis. One end of each shaft 6 is journaled in a bearing 7 secured to the chassis and the opposite end journaled in a bearing 8 secured to the side of the engine. Flywheels 9 are secured to the shafts 6 and are matched as to weight. The flywheels 9 parallel the sides of the engine and are driven from the latter, their rotation being in the same direction and in a direction opposite to the direction of travel of the motor vehicle. The flywheels 9 provide a balancing action for the purpose of counteracting any forces tending to overturn the motor vehicle while traveling upon a curve. The flywheels rotate at the same rate of speed and their rotation is maintained as long as the engine 3 is in operation.

A gear 10 is secured to the crank shaft 5 and meshes with idler gears 11 arranged at opposite sides thereof and suitably journaled to a cross member 12 of the chassis 2. The idler gears mesh with gears 13 secured to shafts 14. The shafts 14 parallel the sides of the engine and are geared to the shafts 6 by meshing gears 15 and 16, the gears 15 being secured to the shafts 14, while the gears 16 are secured to the shafts 6. Thus it will be seen that the flywheels 9 are driven from a single power takeoff of the engine 3 and further it is to be noted that the flywheels are in rotation as long as the crank shaft of the engine is rotating.

A device of this character besides overcoming tendency of the motor vehicle to overturn while traveling upon a curve due to the balancing effect of said flywheels also provides a balancing effect to the crank shaft, consequently producing a smoother running or operating engine. The momentums started up in the flywheels 9 will aid the engine in propelling the vehicle when starting upgrade and the flywheel will retard the engine when descending a grade.

While I have described and shown the automobile as equipped with a pair of flywheels 9 disposed vertically and mounted upon horizontally disposed shafts, it is to be understood that results may be obtained by the use of a single flywheel and also the flywheels may be disposed at a slight inclination.

An engine equipped with the flywheels 9 may have the usual flywheels eliminated if desired.

Having described the invention, I claim:

In combination with a motor vehicle and an engine therefor provided with a power takeoff means, aligned shafts journaled to the motor vehicle and transversely thereof and at opposite sides of the engine, matched flywheels secured to said shafts and having their direction of rotation opposite to the forward movement of the motor vehicle, said flywheel paralleling the sides of the engine and arranged at opposite sides of said engine, and shafts geared to the first-named shafts and to the power takeoff means.

STANLEY J. KRUCZEK.